Oct. 3, 1939.　　　　　R. M. BOWIE　　　　　2,174,853
ELECTRON GUN STRUCTURE AND METHOD OF ASSEMBLY THEREOF
Filed Aug. 26, 1937　　　2 Sheets-Sheet 1
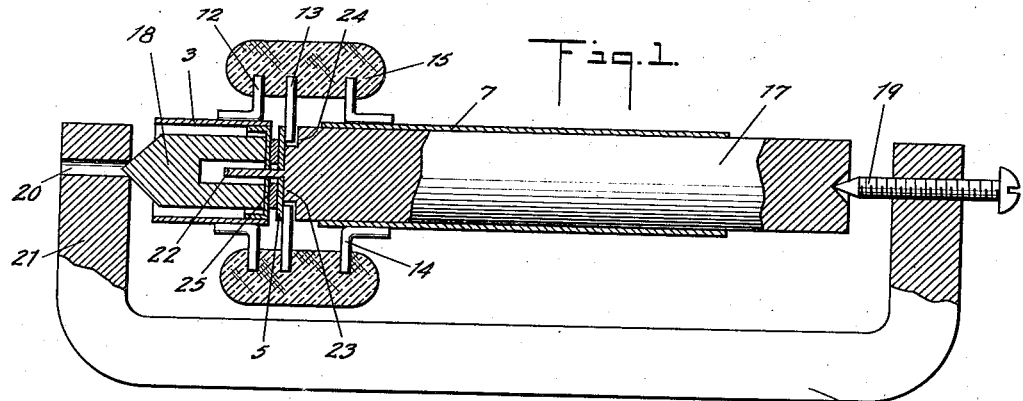
Robert M. Bowie
INVENTOR
BY John J. Rogan
ATTORNEY Oct. 3, 1939.  R. M. BOWIE  2,174,853
ELECTRON GUN STRUCTURE AND METHOD OF ASSEMBLY THEREOF
Filed Aug. 26, 1937  2 Sheets-Sheet 2
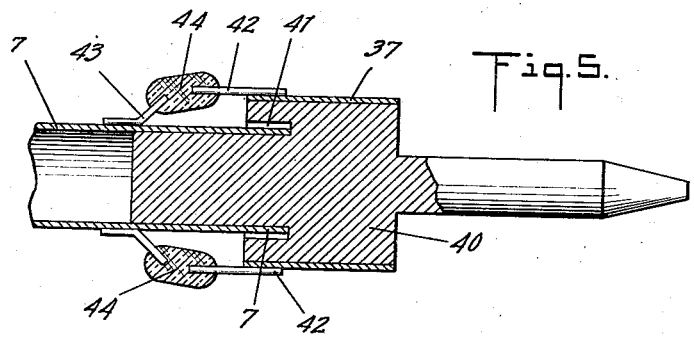
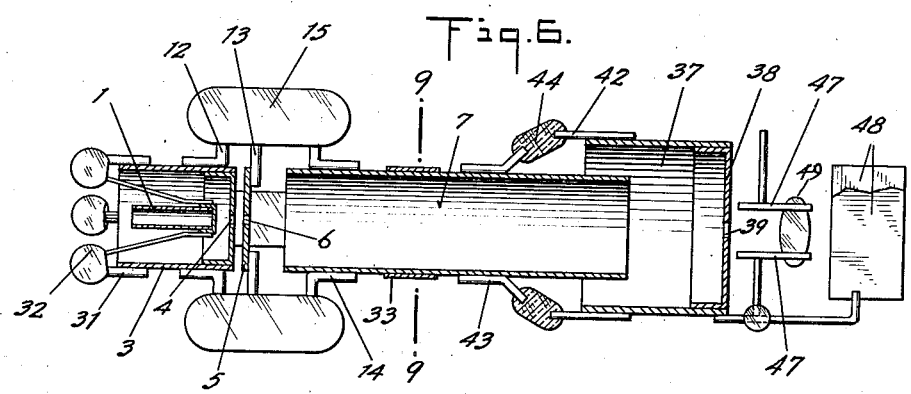
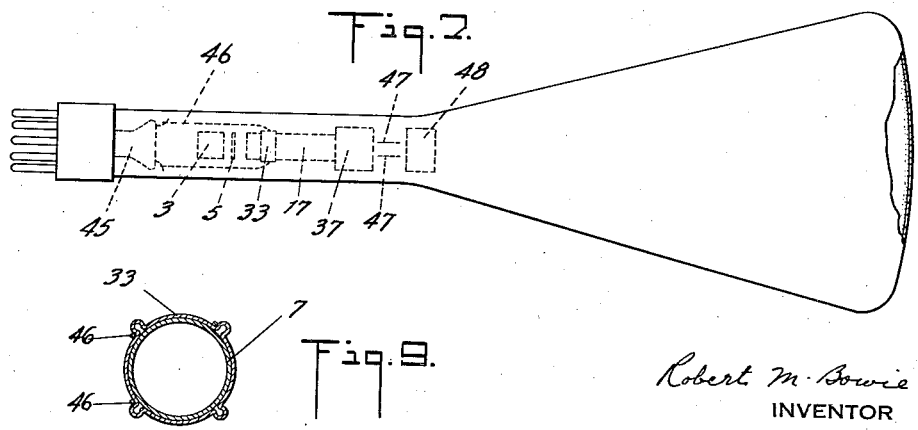
Robert M. Bowie
INVENTOR
BY John J. Rogan
ATTORNEY Patented Oct. 3, 1939

2,174,853

UNITED STATES PATENT OFFICE 2,174,853

ELECTRON GUN STRUCTURE AND METHOD OF ASSEMBLY THEREOF

Robert M. Bowie, St. Marys, Pa., assignor to Hygrade Sylvania Corporation, Salem, Mass., a corporation of Massachusetts Application August 26, 1937, Serial No. 160,981

1 Claim. (Cl. 250—27.5)

This invention relates to electron guns and more particularly to electron guns of the type used in such devices as cathode-ray tubes, television tubes, oscilloscopes and the like.

A principal object of the invention is to provide an economical and highly accurate method of assembling and uniting the parts of an electron gun in rigid predetermined alignment and in insulated spaced relation.

Heretofore in the assembly of electron guns for cathode-ray tubes and the like, it has been proposed to space the parts of the gun from one another by discs or rings of ceramic which were cut, molded or otherwise formed in their final rigid shape prior to assembly of the gun parts thereon. By this prior arrangement it is very essential that all parts be very accurately made in order that the axial symmetry and alignment of the gun shall be maintained. This has rendered necessary the use of expensive ceramic materials and expensive machining and grinding operations. I have found that when this prior method of assembly is employed with inexpensive ceramic materials, the finished gun is apt to exhibit axial misalignment.

Accordingly, it is an object of this invention to provide a gun assembly method and structure which combine the accuracy of the usual expensive ceramic spacer constructions, while employing inexpensive materials for rigidly spacing the parts, thus avoiding the necessity of grinding and accurate machining of the spacers and cooperating parts of the electrodes.

A feature of the invention relates to a method of assembling the parts of an electron gun whereby axial symmetry is assured during each step of the assembly, without requiring the use of preformed rigid spacer members such as ceramic discs, rings or the like.

Another feature relates to a method of assembling and axially aligning the parts of an electron gun whereby the insulator fastening and spacing means are not applied until the parts have been previously mechanically aligned.

A further feature relates to the method of fastening the parts of an electron-gun in axial alignment by using an insulator in a viscous state which, upon hardening, rigidly retains and insulates the parts from one another.

A still further feature relates to the novel organization, arrangement and relative connection of parts which constitute a simple, cheap and highly accurate electron-gun assembly.

Other features and advantages not specifically enumerated will be apparent after a consideration of the following detailed description and the appended claim.

In general, according to the invention, the metal parts of the gun are first assembled in fixed aligned relationship in a rigid but demountable jig, and are then bound together by insulators which are viscous at the time of application but which later solidify into rigid insulating members prior to removal of the jig. As a result of this procedure the gun is in effect a rigid unitary assembly with the parts maintained in accurate axial alignment and insulated effectively from one another. Accordingly, in the drawings, which show preferred embodiments of the methods and products:

Fig. 1 shows preliminary steps in assembling the gun according to the invention.

Fig. 2 represents succeeding steps in the inventive method.

Fig. 3 is a general plan view, partly in section, of a cathode-ray tube embodying the gun assembly of Fig. 2.

Fig. 4 is a sectional view of the gun of Fig. 2 taken along the lines 4—4 thereof.

Figs. 5 and 6 show successive steps in assembling a modified form of electron gun.

Fig. 7 shows the gun of Fig. 6 mounted inside a typical cathode-ray tube envelope.

Fig. 8 is a section of Fig. 2 taken along the lines 8—8 thereof.

Fig. 9 is a cross-sectional view of Fig. 6 taken along the line 9—9 thereof.

Referring to Fig. 2 of the drawings, the electron gun comprises in general an electron-emitting cathode in the form of a hollow metal sleeve 1 of nickel or other suitable metal, having its forward end closed by a metal cap 2, the outer flat surface of the cap being provided with a small spot of electron-emitting material of known composition. It will be understood that the emissive material is arranged to be heated to electron-emitting temperature by a suitable heater (not shown), for example by a heater filament insulatingly mounted within sleeve 1 and capable of being heated in the manner well known in the art. For the purpose of controlling the intensity of the electron beam developed by the cathode, there is a grid electrode in the form of a metal cup 3 provided with a central perforation 4 in axial alignment with the cathode coating. Another electrode 5 in the form of a metal disc having a central perforation 6 is mounted with the said perforation in axial alignment with the perforation 4. A first anode 7 is provided in the shape of a metal tube which is mounted in axial alignment with apertures 4 and 6. Ordinarily a second anode is used in conjunction with the first anode 7. Thus in the tube as shown in Fig. 3, the second anode may consist of a coating 8 of "aquadag" or other conductive material applied to the inside surface of the bulb 9, this coating preferably extending into the neck 10 of the bulb and terminating adjacent the forward end of anode 7 as shown, it being understood that an appropriate connecting wire is sealed into the wall 9 to connect with coating 8.

It is obvious therefore, that if the beam is to be properly focussed on the usual fluorescent coating 11 on the flattened end of tube 9, that the various electrodes described must be maintained in predetermined alignment, and their relatively lateral and longitudinal positions must also be maintained. For this purpose the grid electrode 3, electrode 5 and the first anode 7 are held in axial alignment with one another by four sets of metal tabs or wires, each set comprising three tabs 12, 13, 14. While the drawings show four sets of tabs a greater or less number of sets may be employed. Tabs 12 are welded or otherwise fastened to the electrode 3; tabs 13 are likewise welded to the electrode 5; and tabs 14 are welded to the electrode 7. With the tabs of each set disposed in alignment, they are held rigidly in place in the proper spaced relation by means of beads 15 of an insulating material which can be applied in the viscous state but which upon cooling, hardens to form a rigid insulating mass. For example, these beads may be of glass or other similar material.

The gun may be assembled in successive steps by employing jigs of the type shown in Figs. 1 and 2. The jig of Fig. 1 comprises a bracket 16 adapted to support for horizontal adjustment, a cylindrical mandrel comprising the sections 17, 18. Section 17 is recessed at its right hand end to receive the end of the adjusting screw 19, and the left hand end of section 18 is pointed in order that it may be seated in the opening 20 in bracket arm 21. Before assembling the jig sections, the anode 7 is slipped over the mandrel 17 until it strikes a suitable stop (not shown). The electrode 5 is then slipped over the reduced left hand end 22 of section 17 until it abuts against the shoulder 23. Preferably the section 17 is provided with an additional shoulder 24 to accommodate the tabs 13. A spacing washer 25 preferably made in two separable halves is placed against the electrode 5, whereupon the electrode 3 is slipped over the mandrel end 22 to abut against the washer 25. The mandrel section 18 is then placed in position and the assembled mandrel with the parts described is assembled on the bracket 16 and tightly clamped in axial alignment by means of the screw 19.

At this stage of the assembly the insulator beads 15 have not been applied although the metal tabs 12, 13 and 14 of tungsten, nickel or other material have been welded to their associated electrodes in sets of three with the tabs of each set in alignment longitudinally of the mandrel.

A small intense flame is then applied upon the projecting ends of the metal tabs and by using a piece of glass cane as a welding rod, the bead members 15 are built up between the said tabs. If desired, each of the tabs may have been previously formed with a small glass bead to facilitate the building up of the final unitary bead 15. At the temperature attained during this operation, the viscosity of the glass is so low that no strains can be set up across the glass, consequently as the glass cools, it maintains its configuration with only a very slight shrinkage due to thermal expansion. After the three sets of metal tabs have been thus united together by their respective glass beads, all three beads are heated to the annealing temperature of the glass and are allowed to cool simultaneously. After the beads have hardened, the screw 19 is released and the parts of the jig as well as the washer sections 25 can be withdrawn.

The next step is the assembly of the cathode. This step is illustrated in Fig. 2 and requires a bracket 26 having its right hand end provided with jaws 27 (Fig. 8), one of which is removable and held in place by the screws 28ª. The jaws 27 are adapted to surround and grip the anode 7 to hold the latter firmly in place during the cathode assembly. The cathode assembly comprises the sleeve 1 to which have been previously welded around the periphery thereof a set of wire or metal tabs 28. While the drawings shows only two tabs, preferably there are the same number of tabs as there are sets of tabs 12, 13, 14. The tabs 28 diverge outwardly from the sleeve 1 and are of such a length as to extend outwardly beyond the open end of electrode 3. After the anode 7 and its associated previously united parts (Fig. 1) have been clamped in place by the jaws 27, the sleeve 1 is slipped over the end of the horizontally adjustable mandrel 29 and the mandrel is adjusted to bring the forward end of cap 2 of the cathode into the proper spaced relation to the opening 4. If desired, the cylindrical wall of electrode 3 may be provided with a series of sight openings (not shown) so that the position of cap 2 with respect to opening 4 may be ascertained during the assembly. When the cathode sleeve 1 has been adjusted to the proper position, the mandrel 29 is locked in position by the screw 30.

Preferably the supports 28 which may be of tungsten, nickel or other suitable refractory metal have been previously provided with small glass beads. Likewise the projecting ends of the tabs 31 carried by electrode 3 have been previously provided with small glass beads, it being understood that the parts are assembled so that the projecting ends of tabs 28 are contiguous with the projecting ends of the associated tabs 31. By using a small intense flame, the beads on tabs 28 and the beads on the tabs 31 are caused to join. If necessary, the resultant beads 32 may be built up by heating a small piece of glass cane used as a welding rod. As in the case of the formation of the beads 15, all the beads 32 are brought to their annealing temperature and are allowed to cool simultaneously, thereby holding cathode 1 in its prefixed relationship with respect to grid 3. After the beads 32 are hardened, the screw 30 is loosened and the mandrel 29 may be withdrawn since all the parts of the gun form a unitary rigid assembly, whereupon the arms 27 may be opened to release the gun from the jig.

The unitary gun may be mounted in the neck 10 of the cathode-ray tube (Fig. 3) in any suitable manner, for example a metal ring 33 may be clamped around the anode 7 and suitable support wires 34 welded to this ring are supported from the wires 35 sealed into the press of the tube. It will be understood of course that the cathode-ray tube is provided with suitable beam deflecting means such as an electromagnet 36 surrounding the neck of the tube adjacent the end of the gun. It will also be understood that electrostatic deflecting means in combination with coordinate electromagnetic deflecting means may be employed. In those types of tubes where the second anode is in the form of a metal electrode rather than in the form of a coating such as the coating 8 (Fig. 3) a similar method of assembly may be employed. Thus there is shown in Fig. 6 an electron gun of the same structure as that shown in Fig. 2. In this embodiment however, there is provided a second anode 37 in the form of a metal cylinder of larger diameter than the first anode 7, and adapted to overlap the right hand end of said anode 7 as shown. Preferably also the forward end of electrode 37 is provided with a cap 38 having a central opening 39 designed to be in axial alignment with the openings 4 and 6. The method of assembling and uniting the electrodes 1, 3, 5 and 7 is the same as that described in connection with the corresponding assembly of Fig. 2. However, the mandrel section 17 in this embodiment (Fig. 5) is provided with an enlarged portion 40 of the same diameter as the internal diameter of electrode 37, and this portion 40 is undercut as indicated by the numeral 41 to accommodate the end of anode 7 so as to allow the electrodes 7 and 37 to be positioned in overlapping relation on the mandrel. Electrode 37 is provided with a series of circumferentially spaced metal tabs 42 and likewise the anode 7 is provided with an equal number of circumferentially spaced metal tabs 43 so positioned that when the electrodes 7 and 37 are assembled on the mandrel as shown in Fig. 5, the corresponding tabs 42 and 43 have their ends in adjacent spaced relation whereupon these tabs may be rigidly united by means of glass beads 44 in the manner already described for the beads 15 and 32.

The manner of assembly of the remaining parts of the electron gun is fully described in connection with Figs. 1 and 2 and further description thereof at this point is not believed necessary. The electron gun of Fig. 6 may be supported on the press 45 of the cathode-ray tube by means of the support wires 46. Likewise if desired, a pair of horizontal electrostatic deflecting plates 47 may be insulatingly supported from the anode 37 and a coordinate set of vertical deflecting plates 48 may be insulatingly supported in the manner shown in detail in Fig. 9. The plates 47 may be spaced by a glass bead 49, and plates 48 may be spaced by a similar glass bead (not shown).

While certain specific materials, numbers and arrangement of electrodes and shapes thereof have been described, it will be understood that various changes and modifications may be made therein without departing from the spirit and scope of the invention. Thus one or more perforated diaphragms may be mounted transversely within electrode 7 each diaphragm opening being in alignment with openings 4 and 6. It will also be understood that the invention is not limited to a gun employing the auxiliary electrode 5 and this electrode may be omitted if desired.

What I claim is:

The method of assembling and uniting the parts of an electron gun having at least two cylindrical electrodes which comprises supporting said electrodes on an arbor in axial alignment and longitudinally spaced, welding metal anchoring tabs at the adjacent ends of the electrodes with the tabs in alignment, and then forming rigid insulator links between the said adjacent tabs by applying insulator beads in a viscous state to said tabs, allowing said beads to harden and then removing the arbor.

ROBERT M. BOWIE.